US011702342B2

(12) United States Patent
Frey

(10) Patent No.: US 11,702,342 B2
(45) Date of Patent: Jul. 18, 2023

(54) METHOD OF PRODUCING PURIFIED GRAPHITE

(71) Applicant: ECOGRAF LIMITED, West Perth (AU)

(72) Inventor: Christoph Frey, West Perth (AU)

(73) Assignee: ECOGRAF LIMITED, West Perth (AU)

(*) Notice: Subject to any disclaimer, the term of this patent is extended or adjusted under 35 U.S.C. 154(b) by 0 days.

(21) Appl. No.: 17/626,425

(22) PCT Filed: May 14, 2021

(86) PCT No.: PCT/AU2021/050453
§ 371 (c)(1),
(2) Date: Jan. 11, 2022

(87) PCT Pub. No.: WO2021/232090
PCT Pub. Date: Nov. 25, 2021

(65) Prior Publication Data
US 2022/0259047 A1    Aug. 18, 2022

(30) Foreign Application Priority Data

May 18, 2020  (AU) .................... 2020901589

(51) Int. Cl.
*C01B 32/215* (2017.01)
(52) U.S. Cl.
CPC ........ *C01B 32/215* (2017.08); *C01P 2006/80* (2013.01)
(58) Field of Classification Search
CPC .................. C01B 32/215; C01P 2006/80
See application file for complete search history.

(56) References Cited

U.S. PATENT DOCUMENTS

| 2,787,528 A | 4/1957 | Dorenfeld |
| 2006/0062716 A1 | 3/2006 | Zaghib et al. |

(Continued)

FOREIGN PATENT DOCUMENTS

| AU | 633608 B2 | 2/1993 |
| CN | 101973545 | 2/2011 |

(Continued)

OTHER PUBLICATIONS

English machine translation of RU2141449 (1999).*

(Continued)

*Primary Examiner* — Richard M Rump
(74) *Attorney, Agent, or Firm* — Hamre, Schumann, Mueller & Larson, P.C.

(57) ABSTRACT

A two-stage method of producing purified graphite is described. The first stage of the method comprises the steps of subjecting graphite material to a caustic bake and releasing any remaining caustic using water. The graphite material is then subjected to a first acid wash. Neutralising and washing the acid washed graphite material is then performed to deliver an intermediate purified graphite product. In the second stage the intermediate purified graphite product is subjected to a low temperature caustic leach. Any remaining caustic in the intermediate purified graphite product is released using water, and the intermediate purified graphite product is subjected to a second acid wash. Finally, neutralising and washing the intermediate purified graphite product is performed to deliver a final purified graphite product with a purity of 99.95% C and above.

21 Claims, 3 Drawing Sheets

(56) References Cited

U.S. PATENT DOCUMENTS

2007/0194158 A1    8/2007   Zaghib et al.
2009/0136849 A1    5/2009   Yue et al.

FOREIGN PATENT DOCUMENTS

| | | | |
|---|---|---|---|
| CN | 102701198 | 10/2012 | |
| CN | 102887504 | 1/2013 | |
| CN | 103449425 | 12/2013 | |
| CN | 104591155 | 5/2015 | |
| CN | 106517177 | 3/2017 | |
| CN | 107555426 | 1/2018 | |
| CN | 108059157 | 5/2018 | |
| CN | 108751188 | 11/2018 | |
| CN | 109574003 A * | 4/2019 | ........... C01B 32/215 |
| CN | 111072023 | 4/2020 | |
| EP | 0 238 781 A1 | 9/1987 | |
| EP | 0 238 781 B1 | 8/1990 | |
| RU | 2141449 C1 * | 11/1999 | |
| WO | 2014/157318 | 10/2014 | |

OTHER PUBLICATIONS

English machine translation of CN108059157A (2018).*
Dorfner ANZAPLAN GmbH, "Graphite Purification:Alternatives, Challenges and Cost", Benmark Battery Minerals Week proceedings, Ritz Carlton, Marina del Rey, Los Angeles, Nov. 2019, 22 pages of a written presentation along with a 5 page transcript of a recording of the presentation.
Teng, Study on Purification of Flake Graphite Using High-pressure Alkali Leaching-Atmospheric-Pressure Acid Leaching Method, Kunming University of Science and Technology, Master's Thesis, May 22, 2015, 87 pages.
Lu, et al., "Preparation of high-purity and low-sulphur graphite from Woxna fin Graphite concentrate by alkali roasting", Minerals Engineering 15, 2002, pp. 755-757.
Rao, et al., "Preparation of high pur graphite by alkali digestion method", Scandinavian Journal of Metallurgy, 33(5), 2004, pp. 257-260.
Wang, et al., "A novel technique for microcrystalline graphite beneficiation based on alkali-acid leaching process", Separation Science and Technology, 53:6, 2018, pp. 982-989.
Wang, et al., "Insights into Alkali-Acid Leaching of Sericite: Dissolution Behavior and Mechanism", Minerals, 7, 196 2017, 12 pages.
Thi, et al., "Sulfuric Acid Leaching Process for Producing High Purity Graphite from 92.6% C to 98% C", Wourl Joournal of Research and Review (WJRR), vol. 5, No. 1, Jul. 2017, pp. 23-26.
International Search Report issued in International Application No. PCT/AU2018/051330, dated Mar. 25, 2019, 6 pages.
International Search Report issued in International Application No. PCT/AU2021/050453, dated Jul. 26, 2021, 3 pages.
Written Opinion of the International Searching Authority issued in International Application No. PCT/AU2021/050453, 5 pages.
Written Opinion of the International Preliminary Examining Authority issued in International Application No. PCT/AU2021/050453, 5 pages.
Kumar, et al., "Removal of Ash from Indian Assam Coking Coal Using Sodium Hydroxide and Acid Solutions" Energy Sources, vol. 22, 2000, pp. 187-196.
Wang, et al., "Preparation of high-purity graphite from a fine microcrystalline graphite concentrate: Effect of alkali roasting pretreatment and acid leaching process", Separation Science and Technology, vol. 51, No. 14, 2016, pp. 2465-2472.
Lu, et al., "Preparation of high-purity and low-sulphur graphite from Woxna fine graphite concentrate by alkali roasting" Minerals Engineering, vol. 15, No. 10, Oct. 2002, pp. 755-757.
Extended European Search Report issued in European Patent Application No. 21806627.2, dated Oct. 4, 2022, 9 pages.

* cited by examiner

METHOD OF PRODUCING PURIFIED GRAPHITE

FIELD OF THE INVENTION

The present invention relates to a method of producing purified graphite and relates particularly, though not exclusively, to such a process for producing battery-grade spherical purified graphite (SPG).

BACKGROUND TO THE INVENTION

Spherical graphite is manufactured from flake graphite concentrates in which the flakes have to be rounded to produce spherical particles of graphite. The spherical graphite can be spread thinly and uniformly during the manufacturing process and is used for the anode material in lithium ion batteries. Spherical purified graphite (SPG) is sold as either a coated or uncoated product. Uncoated SPG is manufactured by micronizing, rounding and purifying flake graphite. The bulk of natural, uncoated SPG is currently manufactured in China due to low labour costs and weak environmental regulations. The micronized, rounded graphite is chemically purified from 94% to 99.95% C using strong hydrofluoric and other acids. Impurities will have a deleterious effect on battery performance.

Apart from the environmental concerns, the hydrofluoric acid typically employed in the prior art purification process is also highly toxic and hazardous to use. A great deal of effort is therefore being expended to find a more cost-effective, non-toxic and environmentally sustainable process for the purification of spherical graphite.

With the widespread use of lithium-ion batteries, there is now also a significant market for the recycling of these kinds of batteries. In typical prior art recycling plants, the lithium-ion batteries are first made safe for further treatment, by separating the plastics, aluminium and copper components and directing them to their own recycling processes. The remaining components of the battery after these processes are the chemical and mineral components. "Black mass" is the residue remaining from existing hydrometallurgical processes that recover the valuable metals. The black mass typically consists of a mixture of carbon, lithium, manganese, cobalt and nickel in various ratios, including anode material which consists of natural battery graphite, synthetic graphite and silicon. As graphite comprises almost 50% of the mass of a typical lithium-ion battery, there is a significant benefit to be gained in being able to purify the black mass material for the recovery of high purity graphite.

The present invention was developed with a view to providing a cost-effective and environmentally sustainable method of producing purified graphite with carbon content higher than 99.9%. Although the present invention is described with particular reference to producing battery-grade SPG it will be understood that the method of producing purified graphite may also have wider applications.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a method of producing purified graphite, the method comprising the steps of:

subjecting graphite material to a sodium hydroxide (NaOH) bake;

releasing any remaining NaOH using water;

subjecting the graphite material to a first acid wash;

neutralising and washing the acid washed graphite material to deliver an intermediate purified graphite product;

subjecting the intermediate purified graphite product to a NaOH leach;

releasing any remaining NaOH in the intermediate purified graphite product using water;

subjecting the intermediate purified graphite product to an acid wash; and, neutralising and washing the intermediate purified graphite product to deliver a final purified graphite product.

Preferably the step of subjecting the graphite material to a NaOH bake comprises mixing the graphite material with liquid NaOH (50%) and heating the mixture in a furnace. Typically the mixture is heated to a temperature of between 450° C. and 550° C. Advantageously the mixture is heated for between approximately 25 to 45 minutes. Preferably the mixture is heated to 500° C. for 30 minutes.

Preferably the step of releasing any remaining NaOH comprises immersing the material in hot water. Preferably after the step of releasing any remaining NaOH, the material is washed and filtered. Typically the material is washed and filtered in a wash neutral step at ambient temperature, for about 5 to 10 minutes, using 2.0 to 7.0 parts $H_2O$.

Preferably the step of subjecting the material to a first acid wash comprises washing the material with a diluted acid mixture comprising water and $H_2SO_4$. Typically the diluted acid mixture comprises between 2.0 to 5.0 parts $H_2O$ and between 0.15 and 0.25 parts $H_2SO_4$ 96%. Advantageously the diluted acid mixture comprises 4.0 parts $H_2O$ and 0.17 parts $H_2SO_4$ 96%. Preferably the first acid wash is performed at elevated temperatures in the range of approximately 70° C. to 90° C. to increase reactivity. Typically the first acid wash is performed at an elevated temperature of 80° C. for between about 25 to 45 minutes.

Preferably the step of neutralising and washing the acid washed graphite material comprises filtering the material at ambient temperature and final washing with water at elevated temperatures respectively. Typically the final washing with water occurs at 85° C. for 30 minutes using 20 parts $H_2O$. Preferably the step of neutralising and washing the material comprises washing the acid washed graphite material in 3 to 7 parts $H_2O$ for 3 to 7 minutes while stirring, at ambient temperature.

Preferably the step of subjecting the intermediate purified graphite product to a NaOH leach comprises immersing the intermediate purified graphite product in 0.1 to 0.3 parts NaOH (50%) with 2.0 to 4.0 parts $H_2O$ at low temperature. Typically the NaOH leach takes place at temperatures in the range of 72° C. to 88° C. Preferably the residence time for the NaOH leach is about 1.5 to 2.5 hours.

Preferably the intermediate purified graphite product is preferably neutralized and washed, before it is subject to the acid wash step.

Advantageously the only reagents used are NaOH in the NaOH bake and NaOH leach steps, and $H_2SO_4$ in the acid wash steps.

Preferably the intermediate purified graphite product is finally washed in a water bath and neutralized with water after the acid wash step.

Preferably the acid wash of the intermediate purified graphite product is performed with a diluted acid mixture comprising between 2.0 and 4.0 parts $H_2O$ and 0.01 to 0.04 parts $H_2SO_4$ 96%. Typically the diluted acid mixture comprises 2.5 parts $H_2O$ and 0.03 parts $H_2SO_4$ 96%, and the acid wash is performed at elevated temperatures in the range of approximately 77° C. to 93° C. to increase reactivity. Preferably the acid wash is performed at an elevated temperature of 80° C. for approximately 35 minutes.

By incorporating the second stage NaOH leaching step, with low consumption of chemicals, carbon content of the final purified graphite product can be increased to 99.98%.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of several specific embodiments of the method of producing purified graphite, given by way of example only, with reference to the accompanying drawings, in which.

DETAILED DESCRIPTION OF PREFERRED EMBODIMENTS

Figure 1:
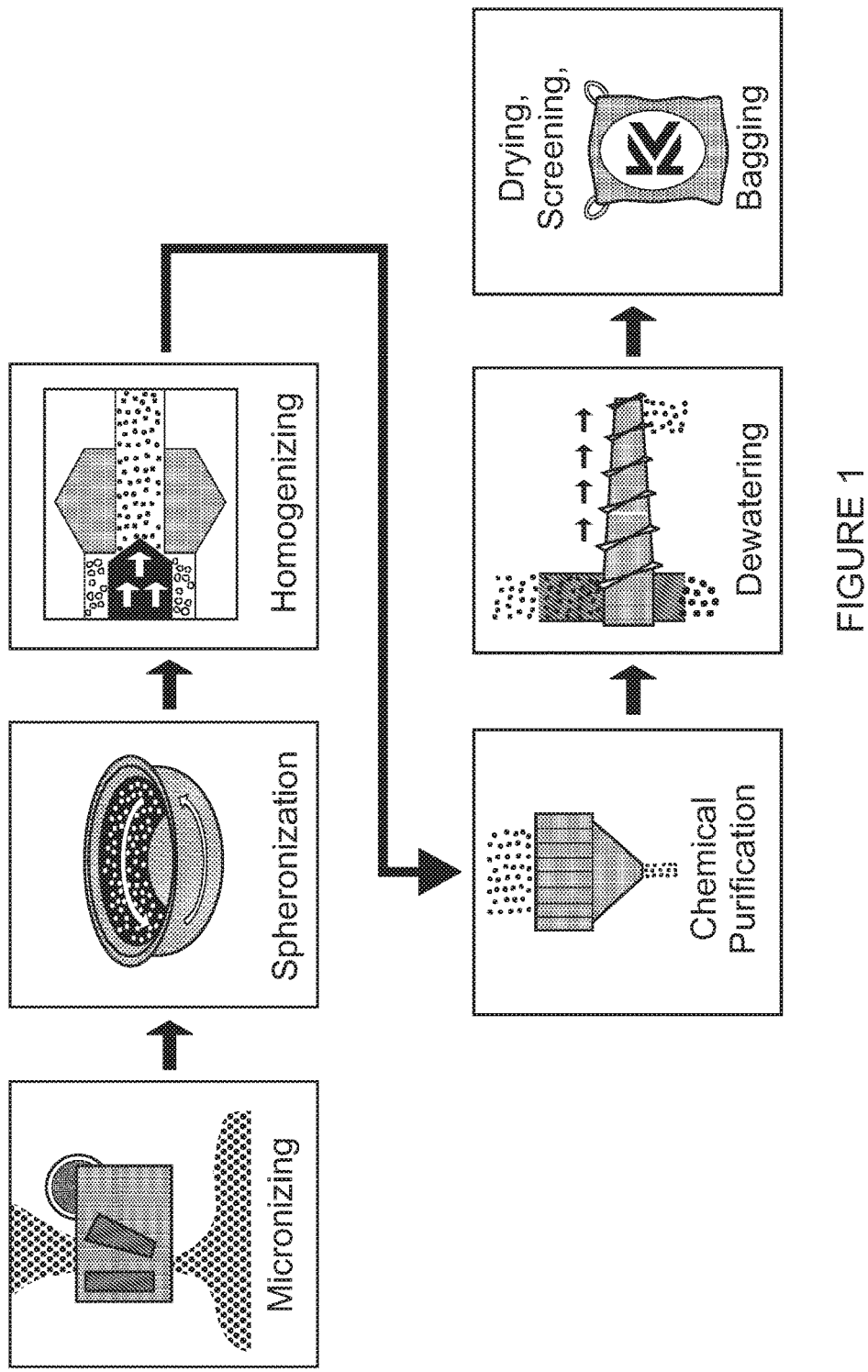
FIG. 1 illustrates a typical manufacturing process for producing purified graphite.

The process of manufacturing purified spherical graphite (SPG) involves the steps of micronizing, rounding, homogenising and purifying flake graphite, as illustrated in FIG. 1. Purification is traditionally done by means of chemical purification, which is followed by dewatering, drying, screening and bagging of the finished SPG product.

Figure 2:
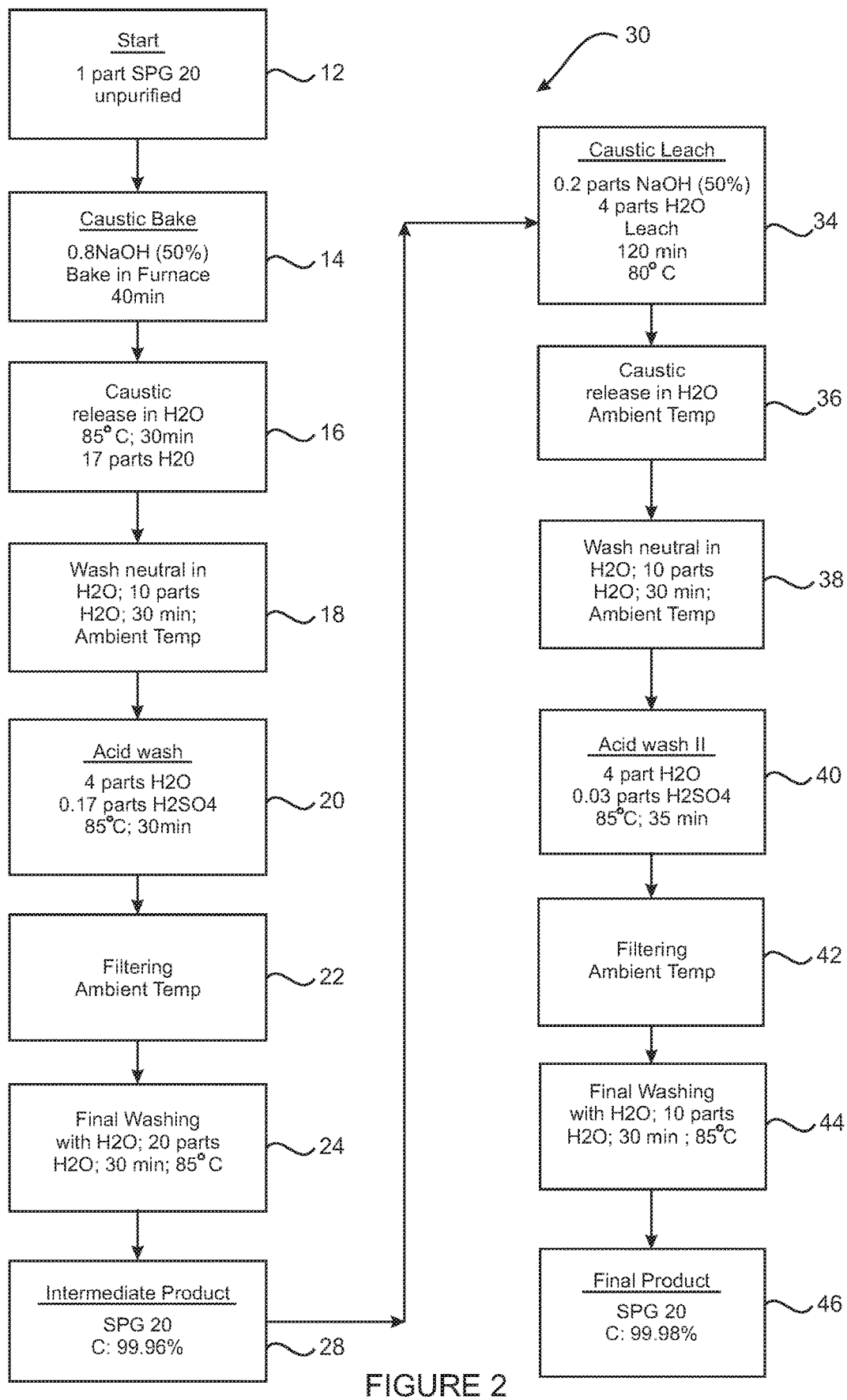
FIG. 2 is a process flow diagram illustrating a first embodiment of the method of producing purified spherical graphite according to the present invention; and, FIG. 3 is a process flow diagram illustrating a second embodiment of the method of producing purified spherical graphite according to the present invention.

A first embodiment of the method 10 of producing purified graphite in accordance with the invention, as illustrated in FIG. 2, comprises the step of subjecting spherical graphite material 12 to a caustic bake, as shown at 14. The starting material 12 is typically 1 part SPG to 20 parts un-purified spherical graphite material. Preferably the step of subjecting the spherical graphite material to a caustic bake comprises mixing the spherical graphite material with liquid NaOH (50%) and heating the mixture in a furnace or kiln. Typically the mixture comprises 0.3 parts water and 0.66 parts NaOH. Preferably the mixture is heated to a temperature of between 400° C. and 550° C., for approximately 25 to 45 minutes. The weight of the material was checked before and after the heat treatment at different temperatures. The results indicate that no graphite burns at a process temperature of 500° C., if the dwelling time does not exceed about 40 minutes. More preferably the mixture is heated to 500° C. for 30 minutes. After the caustic bake the material has a solid consistency (the $H_2O$ from the NaOH has evaporated).

The method further comprises the step of releasing any remaining caustic, at step 16, using water. Preferably the step of releasing any remaining caustic comprises immersing the solid material in water and dissolving any remaining caustic for about 10 to 45 minutes. Typically this is done in warm water, for example, water heated to between 40° C. to 85° C. Typically 1 part spherical graphite material is immersed in from between 3 to 20 parts $H_2O$. In this embodiment 1 part spherical graphite material is immersed in 17 parts $H_2O$, at about 85° C., for 30 minutes.

Preferably, after the step of releasing any remaining caustic, the material is washed and filtered at step 18. Typically this is done at ambient temperature for about 30 minutes using ten parts $H_2O$.

The method further comprises the step of subjecting the material to an acid wash at step 20. Typically the step of subjecting the material to an acid wash comprises washing the material with a diluted acid mixture comprising water and $H_2SO_4$. Typically the diluted acid mixture comprises 4 parts H2O, and 0.17 parts $H_2SO_4$. Preferably the acid wash is performed at elevated temperatures in the range of approximately 77° C. to 93° C. to increase reactivity. More preferably the acid wash is performed at an elevated temperature of 85° C. Typically the material is subjected to an acid wash for about 30 minutes.

The method further comprises the step 22 of filtering and the step 24 of final washing the material to deliver an intermediate spherical purified graphite (SPG) product 28. Preferably the steps of filtering and washing the material comprise filtering the material at ambient temperature and washing with water at elevated temperatures respectively. Typically the final washing with water occurs at 85° C. for 30 minutes using 20 parts $H_2O$.

Advantageously this process delivers an intermediate spherical purified graphite (SPG) product at step 28 with a final purity of 99.96% C.

The method of FIG. 2 further comprises a second stage which begins with the step of subjecting the intermediate SPG product 28 to a caustic leach, at step 34. Preferably the caustic leach step 34 comprises immersing the intermediate SPG product 28 in 0.2 parts NaOH (50%) with four parts $H_2O$. Preferably the caustic leach step 34 is performed at relatively low temperatures in the range of approximately 77° C. to 93° C. for about 1.5 to 2.5 hours. More preferably the caustic leach step is performed at 80° C. for about 120 minutes.

The method further comprises the step of releasing any remaining caustic, at step 36, using water. Preferably the step of releasing any remaining caustic comprises immersing the material in $H_2O$ for about 30 minutes at ambient temperature.

Preferably, after the step of releasing any remaining caustic, the material is washed and filtered at step 38. Preferably the neutral wash at step 38 is done at ambient temperature for about 30 minutes, using ten parts $H_2O$.

The method further comprises the step of subjecting the intermediate SPG product to a second acid wash at step 40. Typically the step of subjecting the material to a second acid wash comprises washing the material with a diluted acid mixture comprising water and $H_2SO_4$, where a very low concentration of $H_2SO_4$ is sufficient (preferably between 0.01 to 0.04 parts $H_2SO_4$ and 4 parts water). Typically the diluted acid mixture comprises 4 parts $H_2O$ and 0.03 parts $H_2SO_4$. Preferably the second acid wash is performed at elevated temperatures in the range of approximately 77° C. to 93° C. to increase reactivity. More preferably the second acid wash is performed at an elevated temperature of 85° C. for approximately 35 minutes.

The method further comprises the step of filtering the intermediate SPG product, at 42, and final washing and neutralization with water at step 44, to deliver a final SPG product at 46. Preferably the steps of filtering and washing the material comprise filtering the material at ambient temperature and washing with water at elevated temperatures respectively. Typically the final washing with water occurs at 85° C. for 30 minutes using 10 parts $H_2O$.

By incorporating the second stage caustic leaching step 34, with low consumption of chemicals, the carbon content of the final SPG product at 46 can be increased to 99.98%.

Test Work

The parameters listed in Table 1 are for the first embodiment of the method 30 of purifying SPG illustrated in FIG. 2.

The method of FIG. 2 is in two parts, and the table of parameters in Table 1 is therefore shown in two parts. Part 1 corresponds to the first stage of the method in FIG. 2. Part 2 corresponds to the second stage of the method in FIG. 2, which includes the caustic leach.

TABLE 1

Preferred parameters for method 30 of FIG. 2

| Part 1 | | Part 2 | |
|---|---|---|---|
| Test# | TW 10 part 11 | Test # | TW 10 part 2 |
| Sample # | S#1080 | Sample # | S#1083 |
| ([g] Graphite) | 60.28 | NaOH (50 ig %) [g] | 11.03 |
| NaOH (50%) [g] | 48.03 | ratio NaOH:Graphite | 0.20 |
| ratio NaOH:Graphite | 0.80 | Temperature | 88 |
| Temperature | 500 | duration (min) | 120 |
| duration (min) | 38 | Water (g) | 221.76 |
| | | Ratio | 3.696 |
| cool down | yes | "neutral" washing | Yes |
| Water (g) | 1000 | Water (g) | 600 |
| ratio Water:Graphite | 17 | Ratio | 10 |
| Temperature (° C.) | 75 | | |
| duration (min) | 60 | Water (g) | 600 |
| "neutral" washing | yes | | 10 |
| Water (g) | 850 | Temperature (° C.) | 78 |
| Ratio | 14 | duration (min) | 30 |
| Water (g) | 241.95 | Water (g) | 220.23 |
| Ratio | 4.01 | Ratio | 3.67 |
| H2SO/HNO3 (g) | 10.06 | H2SO 96% (g) | 1.6 |
| ratio H2SO4:Graphite | 0.17 | ratio H2SO4:Graphite | 0.029 |
| Temperature (° C.) | 80 | Temperature (° C.) | 90 |
| duration (min) | 35 | duration (min) | 35 |
| filtering | yes | filtering | yes |
| Water (g) | 1000 | Water (g) | 600 |
| Ratio | 16.6 | Ratio | 10 |
| Temperature (° C.) | 98 | Temperature (° C.) | 98 |
| duration (min) | 40 | duration (min) | 80 |
| C-content (%) | 99.96 | Sample # | S#1083 |
| sample material | ca 55 g | C-content (%) | 99.98 |
| Sample # | S#1080 | sample material | ca 50 g |

Figure 3:
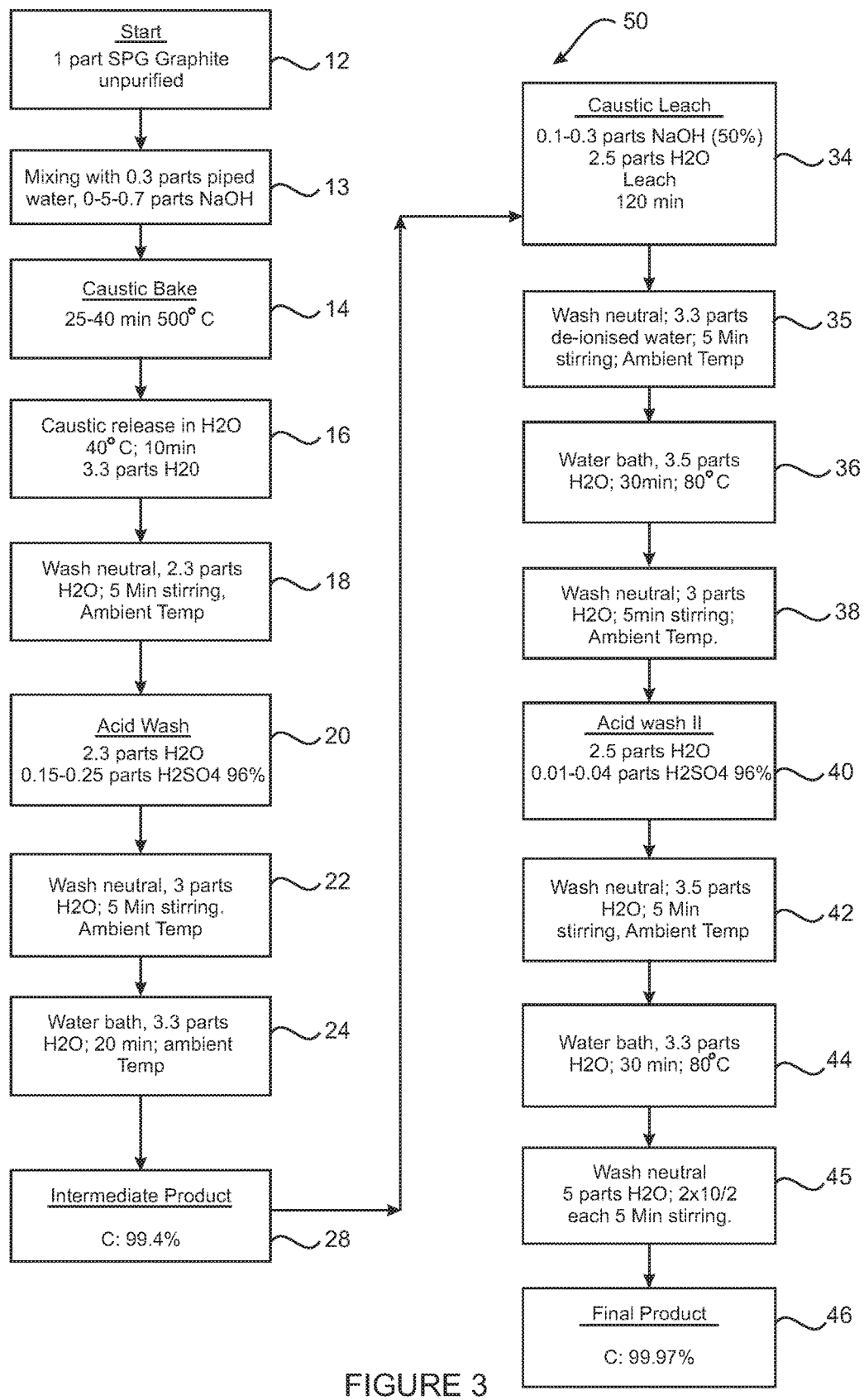

FIG. 3 illustrates a second embodiment of the method 50 of producing purified spherical graphite. This second embodiment of the method of the invention is similar in many respects to the method of FIG. 2, and therefore the like reference numerals will be used to identify what are essentially the same method steps, and these will not be described again in detail. As with method 30 of FIG. 2, this is also a two stage process, but with lower chemical consumption and lower water consumption.

As with the first embodiment, the second embodiment of method 50 of FIG. 3 starts with 1 part unpurified SPG graphite, at step 12. This is followed by a mixing step 13, which involves mixing the graphite with NaOH. Preferably the mixture comprises from between 0.5 to 0.7 parts NaOH, and from between 0.2 to 0.4 parts piped water. More preferably the mixture comprises 0.3 parts of piped (tap) water and 0.66 parts of NaOH. The method 50 also comprises the step 14 of subjecting spherical graphite material to a caustic bake in which a mixture of the spherical graphite material and NaOH is heated to a temperature of between 400° C. and 550° C., for approximately 25 to 45 minutes. More preferably in the caustic bake step 14 the mixture is heated to 500° C. for about 30 minutes.

The caustic bake step 14 is followed by a caustic release step 16 of dissolving any remaining caustic in a water bath, in order to cool down and to release the impurities, which are soluble in water. Preferably the caustic release step 16 in this embodiment comprises immersing the solid material in water and dissolving any remaining caustic for about 5 to 15 minutes.

Typically this is done in warm water, for example, water heated to between 35° C. to 45° C. Typically 1 part spherical graphite material is immersed in from between 2 to 5 parts $H_2O$. In this embodiment 1 part spherical graphite material is immersed in 3.3 parts $H_2O$, at about 40° C., for 10 minutes.

Preferably, after the caustic release step 16, the material is washed and filtered at wash neutral step 18. Typically this is done at ambient temperature, for about 5 to 10 minutes, using 2.0 to 7 parts $H_2O$. In the illustrated example, the wash neutral step 18 is done at ambient temperature, for about 5 minutes stirring, using 2.3 parts $H_2O$. After 10 minutes the slurry is filtered until the pH value is neutral. After the caustic bake the material has a solid consistency, which is then subject to a first acid wash at step 20. The filter cake material is put in a moist condition into a stirred reactor, filled with diluted acid. Gentle stirring supports the process of dissolving impurities. The first acid wash is preferably performed with a mixture of between 2.0 to 5.0 parts $H_2O$ and between 0.15 and 0.25 parts $H_2SO_4$ 96% at elevated temperatures. Preferably the filter cake material remains in the stirred reactor for 25 to 45 minutes, and the temperature is kept at between 70° C. and 90° C. More preferably the first acid wash step 20 is performed with 4.0 parts $H_2O$ and 0.17 parts $H_2SO_4$ 96% at 80° C. for 35 minutes.

Wash neutralization of the material at step 22 is used to separate the acid and the dissolved impurities. The wash neutralization step 22 preferably comprises washing the acid washed graphite material in 3 to 7 parts $H_2O$ for 3 to 7 minutes while stirring, at ambient temperature. Typically the wash neutralization step 22 comprises washing the acid washed graphite material in 5 parts $H_2O$ for 5 minutes, while stirring at ambient temperature. Afterwards the material is subject to a water bath, having between 2 to 8 parts $H_2O$, for 20 to 40 minutes, at ambient temperature, to further eliminate impurities, at step 24. Preferably the water bath 24 is performed with 7 parts $H_2O$, for 40 minutes, at ambient temperature. The wash neutralization step 22 should be repeated until the pulp is pH neutral. The end result of this first stage of the method 50 is to deliver an intermediate spherical purified graphite (SPG) product 28 with a purity of 99.4% C to 99.9% C.

The first stage of method 50 is basically the same as in the first embodiment (method 30 in FIG. 2), except that in this case an additional mixing step 13 was introduced prior to the caustic bake. The first stage is done with tap water, the second stage is done with de-ionised water.

In the second stage, the method 50 of FIG. 3 further comprises the step of subjecting the intermediate SPG product 28 to a caustic leach, at step 34. Preferably the caustic leach step 34 comprises immersing the intermediate SPG product 28 in 0.1 to 0.3 parts NaOH (50%) with 2.0 to 4.0 parts $H_2O$. More preferably the caustic leach step 34 comprises immersing the intermediate SPG product 28 in 0.2 parts NaOH (50%) with 2.5 parts $H_2O$. Preferably the caustic leach step 34 is performed at relatively low temperatures in the range of approximately 77° C. to 93° C. for about 1.5 to 2.5 hours. More preferably the caustic leach step is performed at 80° C. for about 120 minutes. The concentration of NaOH is low, however there is still sufficient for the low amount of remaining impurities in the graphite to be removed. The process is probably supported by the liquid phase, which enables a better mobility of the Na+ ions. Due to the lower temperature, the reactivity is slower; therefore 2 hours reaction time was identified as a suitable duration.

After the caustic leach, the caustic water with the dissolved impurities needs to be neutralised by washing and filtering at step 35. The wash neutralisation step 35 preferably comprises washing the leached graphite material in 3 to 7 parts $H_2O$ for 3 to 7 minutes while stirring, at ambient temperature. Typically the wash neutralization step 35 comprises washing the acid washed graphite material in 5 parts de-ionised $H_2O$ for 5 minutes, while stirring at ambient temperature. Afterwards the material is subject to a water bath, having between 2 to 8 parts $H_2O$, for 20 to 40 minutes, at elevated temperatures, to further eliminate impurities, at step 36. Preferably the water bath 36 is performed with 3.5 parts $H_2O$, for 30 minutes, at 80° C. The water bath 36 supports the dissolution of more-slowly dissolving impurities and the releasing of any remaining caustic. The wash neutralization step may need to be repeated until the pulp is pH neutral (see further wash neutralization step 38).

The method 50 further comprises the step of subjecting the intermediate SPG product to a second acid wash at step 40. Typically the second acid wash step 40 comprises washing the material with a diluted acid mixture comprising water and $H_2SO_4$, where a very low concentration of $H_2SO_4$ is sufficient. The filter cake is put in a moist condition into a stirred reactor, filled with diluted acid. The acid concentration is very low, as the amount of impurities to dissolve is very low. Stirring supports the process of dissolving impurities. Preferably the diluted acid mixture comprises between 2.0 and 4.0 parts $H_2O$ and 0.01 to 0.04 parts $H_2SO_4$ 96%. Typically the diluted acid mixture comprises 2.5 parts $H_2O$ and 0.03 parts $H_2SO_4$ 96%. Preferably the second acid wash is performed at elevated temperatures in the range of approximately 77° C. to 93° C. to increase reactivity. More preferably the second acid wash is performed at an elevated temperature of 85° C. for approximately 35 minutes.

The method 50 further comprises a further step of wash neutralization of the intermediate SPG product, at 42, and final washing and neutralization with water at steps 44 and 45, to deliver a final SPG product at 46 with a purity of 99.95% C and above. Preferably the steps of neutralization and washing the material comprise a wash neutralising step 42 of the material at ambient temperature and a water bath 44 at elevated temperatures respectively. The wash neutralisation step 42 preferably comprises washing the graphite material in 3 to 10 parts $H_2O$, 3×10/3 each 1 minute stirring, at ambient temperature. Typically the wash neutralization step 42 comprises washing the acid washed graphite material in 3.5 parts $H_2O$ for 5 minutes, while stirring at ambient temperature. Afterwards the material is subject to another water bath 44, having between 2 to 10 parts $H_2O$, for 20 to 40 minutes, at elevated temperatures, to further eliminate impurities. Preferably the water bath 42 is performed with 3.5 parts $H_2O$, for 30 minutes, at 80° C.

A further wash neutralization step 45 may be needed until the graphite material is pH neutral. The wash neutralisation step 45 preferably comprises washing the graphite material in 3 to 10 parts $H_2O$, 2×10/2 each 5 minute stirring, at ambient temperature.

The final filtration is also the dewatering step before the graphite is put into a dryer. Recommended temperatures for drying are relatively low (below 150° C.) to prevent any damage to the particles which could occur if higher temperatures are applied.

The second stage of this method 50 is basically the same as for the first method 30 above, except that additional wash neutralization steps 35, 42 and 45 have been introduced.

Although the above described embodiments describe a method of purifying graphite using purified spherical graphite (SPG) as the starting material, the same chemical purification process can also be used with flake graphite as the starting material or for purifying black mass, a residue produced in the recycling of Lithium-ion batteries. Black mass is the residue remaining from existing hydrometallurgical processes that recover the valuable metals. The purification process increases the grade from 30-50% carbon to +99% carbon to re-use in graphite markets.

Now that preferred embodiments of the method of purifying SPG have been described in detail, it will be apparent that the described embodiments provide a number of advantages over the prior art, including the following:
  (i) The method is relatively simple, using standard industrial process steps, and yet is capable of achieving a purity of 99.95% C and above.
  (ii) The amount of caustic and acid used for the purification process is significantly reduced compared to prior art methods, and the process time is also shortened.
  (iii) The chemicals used in the method are more environmentally sustainable than prior art methods and do not harm the spherical graphite product.

It will be readily apparent to persons skilled in the relevant arts that various modifications and improvements may be made to the foregoing embodiments, in addition to those already described, without departing from the basic inventive concepts of the present invention. For example, the method comprises a multi-step and multi-parameter (temperatures, residence time, concentration of acids and caustic, volume of wash water, etc.) process, and therefore sophisticated optimization will undoubtedly yield further improvements in purity and cost savings. Furthermore although the process is described applied unpurified SPG, it is not limited to spherical graphite but could also be applied using other types of flake graphite as a precursor material, such as screened fractions of a flake graphite concentrate or a by-product from spherical graphite production. Therefore, it will be appreciated that the scope of the invention is not limited to the specific embodiments described.

The invention claimed is:

1. A method of producing purified graphite, the method comprising:
  subjecting graphite material to a sodium hydroxide (NaOH) bake, the subjecting of the graphite material to the NaOH bake comprising mixing the graphite material with liquid NaOH (50%) and heating the mixture in a furnace to 500° C. for 30 minutes;
  releasing any remaining NaOH using water;
  subjecting the graphite material to a first acid wash;
  neutralising and washing the acid washed graphite material to deliver an intermediate purified graphite product;
  subjecting the intermediate purified graphite product to a NaOH leach;
  releasing any remaining NaOH in the intermediate purified graphite product using water;
  subjecting the intermediate purified graphite product to a second acid wash; and neutralising and washing the intermediate purified graphite product to deliver a purified graphite product.

2. The method of claim 1, wherein the releasing of any remaining NaOH comprises immersing the graphite material in hot water.

3. The method of claim 1, wherein, after the releasing of any remaining NaOH, the graphite material is washed and filtered.

4. The method of claim 1, wherein the subjecting of the graphite material to the first acid wash comprises washing the graphite material with a diluted acid mixture comprising water and $H_2SO_4$.

5. A method of producing purified graphite, the method comprising:
   subjecting graphite material to a sodium hydroxide (NaOH) bake at a temperature of between 400° C. and 550° C.;
   releasing any remaining NaOH using water;
   subjecting the graphite material to a first acid wash, the subjecting of the graphite material to the first acid wash comprising washing the graphite material with a diluted acid mixture comprising between 2.0 to 5.0 parts $H_2O$ and between 0.15 and 0.25 parts $H_2SO_4$ 96%;
   neutralising and washing the acid washed graphite material to deliver an intermediate purified graphite product;
   subjecting the intermediate purified graphite product to a NaOH leach;
   releasing any remaining NaOH in the intermediate purified graphite product using water;
   subjecting the intermediate purified graphite product to a second acid wash; and
   neutralising and washing the intermediate purified graphite product to deliver a purified graphite product.

6. The method of claim 4, wherein the first acid wash is performed at elevated temperatures in the range of approximately 70° C. to 90° C. to increase reactivity.

7. The method of claim 6, wherein the first acid wash is performed at an elevated temperature of 80° C. for between about 25 to 45 minutes.

8. The method of claim 1, wherein the neutralising and washing of the acid washed graphite material comprises filtering the acid washed graphite material at ambient temperature and washing the acid washed graphite material with water at an elevated temperature respectively.

9. The method of claim 1, wherein the intermediate purified graphite product is neutralized and washed, before the intermediate purified graphite product is subject to the second acid wash.

10. The method of claim 1, wherein the only reagents used are NaOH in the NaOH bake and the NaOH leach, and $H_2SO_4$ in the first acid wash and the second acid wash.

11. The method of claim 10, wherein the intermediate purified graphite product is washed in a water bath and neutralized with water after the second acid wash.

12. A method of producing purified graphite, the method comprising:
   subjecting graphite material to a sodium hydroxide (NaOH) bake at a temperature of between 400° C. and 550° C.;
   releasing any remaining NaOH using water;
   after the releasing of any remaining NaOH, washing and filtering the graphite material at ambient temperature, for about 5 to 10 minutes, using 2.0 to 7.0 parts $H_2O$;
   subjecting the washed and filtered graphite material to a first acid wash;
   neutralising and washing the acid washed graphite material to deliver an intermediate purified graphite product;
   subjecting the intermediate purified graphite product to a NaOH leach;
   releasing any remaining NaOH in the intermediate purified graphite product using water;
   subjecting the intermediate purified graphite product to a second acid wash; and
   neutralising and washing the intermediate purified graphite product to deliver a purified graphite product.

13. The method of claim 5, wherein the diluted acid mixture comprises 4.0 parts $H_2O$ and 0.17 parts $H_2SO_4$ 96%.

14. A method of producing purified graphite, the method comprising:
   subjecting graphite material to a sodium hydroxide (NaOH) bake at a temperature of between 400° C. and 550° C.;
   releasing any remaining NaOH using water;
   subjecting the graphite material to a first acid wash;
   neutralising and washing the acid washed graphite material to deliver an intermediate purified graphite product, the neutralising and washing of the acid washed graphite material comprising filtering the acid washed graphite material at ambient temperature and washing the acid washed graphite material with water at 85° C. for 30 minutes using 20 parts $H_2O$ respectively;
   subjecting the intermediate purified graphite product to a NaOH leach;
   releasing any remaining NaOH in the intermediate purified graphite product using water;
   subjecting the intermediate purified graphite product to a second acid wash; and
   neutralising and washing the intermediate purified graphite product to deliver a purified graphite product.

15. A method of producing purified graphite, the method comprising:
   subjecting graphite material to a sodium hydroxide (NaOH) bake at a temperature of between 400° C. and 550° C.;
   releasing any remaining NaOH using water;
   subjecting the graphite material to a first acid wash;
   neutralising and washing the acid washed graphite material to deliver an intermediate purified graphite product, the neutralising and washing of the acid washed graphite material comprising washing the acid washed graphite material in 3 to 7 parts $H_2O$ for 3 to 7 minutes while stirring at ambient temperature;
   subjecting the intermediate purified graphite product to a NaOH leach;
   releasing any remaining NaOH in the intermediate purified graphite product using water;
   subjecting the intermediate purified graphite product to a second acid wash; and
   neutralising and washing the intermediate purified graphite product to deliver a purified graphite product.

16. A method of producing purified graphite, the method comprising:
   subjecting graphite material to a sodium hydroxide (NaOH) bake at a temperature of between 400° C. and 550° C.;
   releasing any remaining NaOH using water;
   subjecting the graphite material to a first acid wash;
   neutralising and washing the acid washed graphite material to deliver an intermediate purified graphite product;
   subjecting the intermediate purified graphite product to a NaOH leach, the subjecting of the intermediate purified graphite product to the NaOH leach comprising immersing the intermediate purified graphite product in 0.1 to 0.3 parts NaOH (50%) with 2.0 to 4.0 parts $H_2O$;

releasing any remaining NaOH in the intermediate purified graphite product using water;

subjecting the intermediate purified graphite product to a second acid wash; and neutralising and washing the intermediate purified graphite product to deliver a purified graphite product.

17. The method of claim 16, wherein the NaOH leach takes place at temperatures in the range of 72° C. to 88° C.

18. The method of claim 17, wherein the residence time for the NaOH leach is about 1.5 to 2.5 hours.

19. A method of producing purified graphite, the method comprising:

subjecting graphite material to a sodium hydroxide (NaOH) bake at a temperature of between 400° C. and 550° C.;

releasing any remaining NaOH using water;

subjecting the graphite material to a first acid wash;

neutralising and washing the acid washed graphite material to deliver an intermediate purified graphite product;

subjecting the intermediate purified graphite product to a NaOH leach;

releasing any remaining NaOH in the intermediate purified graphite product using water;

subjecting the intermediate purified graphite product to a second acid wash performed with a diluted acid mixture comprising between 2.0 and 4.0 parts $H_2O$ and 0.01 to 0.04 parts $H_2SO_4$ 96%; and neutralising and washing the intermediate purified graphite product to deliver a purified graphite product.

20. The method of claim 19, wherein the diluted acid mixture comprises 2.5 parts $H_2O$ and 0.03 parts $H_2SO_4$ 96%, and the second acid wash is performed at elevated temperatures in the range of approximately 77° C. to 93° C. to increase reactivity.

21. The method of claim 20, wherein the second acid wash is performed at an elevated temperature of 80° C. for approximately 35 minutes.

* * * * *